US006922687B2

(12) United States Patent
Vernon

(10) Patent No.: US 6,922,687 B2
(45) Date of Patent: Jul. 26, 2005

(54) CLOSED LOOP ASSET MANAGEMENT PROCESS

(75) Inventor: William Earl Vernon, Parker, TX (US)

(73) Assignee: Barca, L.L.C., Houston, TX (US)

( * ) Notice: Subject to any disclaimer, the term of this patent is extended or adjusted under 35 U.S.C. 154(b) by 414 days.

(21) Appl. No.: 10/028,055

(22) Filed: Dec. 21, 2001

(65) Prior Publication Data
US 2003/0120677 A1 Jun. 26, 2003

(51) Int. Cl.[7] ............................................. G06F 17/30
(52) U.S. Cl. ........................... 707/1; 707/104.1; 707/10
(58) Field of Search .......................... 707/1–10, 104.1, 707/100, 103 R; 705/28, 29, 56

(56) References Cited

U.S. PATENT DOCUMENTS

| 5,424,944 | A | 6/1995 | Kelly et al. | 705/28 |
|---|---|---|---|---|
| 6,438,535 | B1 | 8/2002 | Benjamin et al. | 707/2 |
| 2001/0051905 | A1 * | 12/2001 | Lucas | 705/29 |
| 2003/0158796 | A1 * | 8/2003 | Balent | 705/28 |

OTHER PUBLICATIONS

Balent, Bruce F. Provisional application No. 60/339,166 filed on Dec. 8, 2001.*

* cited by examiner

Primary Examiner—Charles Rones
Assistant Examiner—Neveen Abel-Jalil
(74) Attorney, Agent, or Firm—Fish & Richardson P.C.

(57) ABSTRACT

A method and system for managing assets used in business. A central computer database has records of tracked items identified by a unique identifying code. A communications link is provided between a scanner and the central computer database at each point in a cycle of change in status of the item. The code is scanned or otherwise given to the database when the item status is changed and the information scanned is transmitted to the central computer database. This arrangement provides users real-time sharing of relevant information such as order status, stocking location, notifications, or any other special instructions. The unique identifier number is physically placed on the item wherever possible. The unique identifier is unique for all items tracked by the system. No two items of different classes or within the same class possess the same unique identifier number.

30 Claims, 13 Drawing Sheets

CLOSED LOOP ASSET MANAGEMENT PROCESS

BACKGROUND

This invention relates to automated managing of physical assets.

Managing customer premise equipment is a major challenge for many industries, particularly for those firms who have multiple service locations. Most customer premise equipment service providers, for instance, lack the information necessary to accurately quantify the costs associated with lost and stolen inventory, multiple shipments of parts, excessive inventory of field spares, repeat visits to customer sites caused by ineffective use of field stock inventory, billing errors, tracking of upgrades and warranty issues and lost future sales due to customer dissatisfaction caused by failing to meet existing service obligations.

One approach to managing customer premises equipment is a so-called open-loop control system. An open-loop system is a control mechanism that does not provide a feedback loop to its users during the process. A water treatment system that tests water as it flows through a meter, but does not use the information gained to adjust the process, is one example of an open-loop system.

Another example of an open-loop system is a private-package shipper that tracks a shipment of parts from a manufacturer to a depot through delivery to a customer's site. However, the open-loop nature of this system does not allow for feedback during the process, e.g., the customer cannot change his mind about the destination of a package once the shipper receives the package. Moreover, once delivered, the tracking system shuts down and collects no further information on that shipment. Thus, this open-loop tracking system is temporal in nature and cannot tell what happens to a specific package after delivery. All a customer knows is that a quantity of parts were delivered to a known address by a certain date.

SUMMARY

According to an additional aspect of the present invention, a system for managing physical assets, includes a computer database that tracks physical assets based on a machine scannable identifying label attachable to physical assets. The system also includes a scanner capable of reading the identifying labels and a communications link between the at least one scanner and the computer database. In the system the identifying label is scanned by the at least one scanner and the identification information is transmitted over the communications link to the computer database.

According to an additional aspect of the present invention, a method of asset management includes providing a central computer database having records of tracked items identified by a unique identifying code. The method also includes providing a communications link between a scanner and the central computer database. Whenever the status of the item changes, the machine scannable label is scanned when the item status is changed and that information is transmitted to the central computer database.

This invention, provides a technique that links together components of a business method. By providing a digital link between these various components, the invention can significantly increase productivity by lowering inventory carrying costs, reducing nonproductive service calls, decreasing returns of non-defective inventory, tracking warranty and service information, and improving customer retention and so forth.

One or more aspects of the invention may provide one or more of the following advantages.

Advantages from the closed loop asset management system include providing real time information. Such real-time information includes real-time location tracking information for parts, real-time delivery dates for parts in route and real-time inventory status for centralized distribution centers, receiving stations, and field service. Additionally, the inventor can also provide real-time service order status, billing information, dispatch status, identification tracking and warranty information and tracking. Other features and advantage are possible.

Any situation where it is economically desirable to track specific units is a potential closed-loop asset management application. One example is new cars. Cars currently come with a unique vehicle identification number (VIN). Typically, separate bar codes are added during the shipping and receiving phase. The actual VIN could be scanned into a closed-loop system and then tracked for the rest of the vehicle's useful life. The VIN could be scanned at each point in the distribution process, e.g., dealer prep and stocking, sale, service work, warranty issues, re-sales, disposal and other identified useful points. Even the engine, transmission, body parts, and so on could be individually tracked. Examples of other applications categories include vendor/customer premise equipment service-provider/customer partnership, field service support, centralized inventory database, depot support, field dispatch, Web-based planning and forecasting system, automatic part processing, and disposition of defective parts. The invention may be used beneficially with other asset classes than those described below.

The details of one or more embodiments of the invention are set forth in the accompanying drawings and the description below. Other features, objects, and advantages of the invention will be apparent from the description and drawings, and from the claims.

DETAILED DESCRIPTION

Closed Loop Asset Management Process

Figure 1:
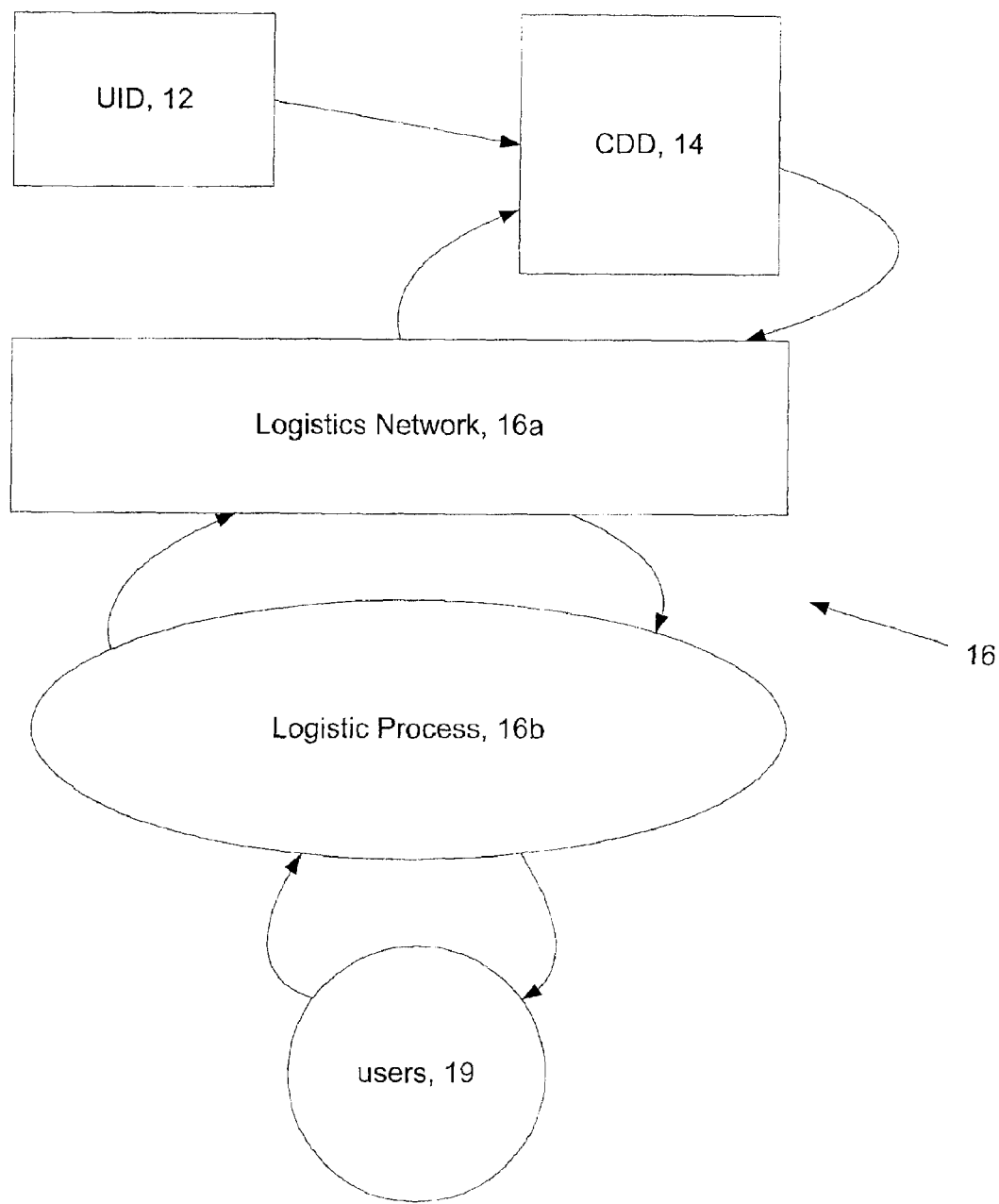
FIG. 1 is a diagram of a closed loop asset management system architecture.

Referring to FIG. 1, an architecture 10 for a closed loop asset management process that collaboratively aligns and integrates supply chain and business process architectures to optimize business efficiency is shown. The closed loop asset management process architecture 10 includes a unique identifier process 12, a centralized digital database system 14, a logistical asset management network 16, logistical asset management process 17.

Each asset to be monitored receives a serialized barcode number during the unique identifier process 12. The bar code number is used to produce an electronic signature for the asset. The closed loop asset management process scans each barcode, along with all other relevant information on that asset, into the centralized digital database 14 (CDD). The central database 14 interfaces to other components in the process through a logistical asset manger process network 16. The logistical asset management network and process 16 includes a communication network 16a and a physical process 16b that provides feedback and interfaces to components of the closed loop asset management process architecture 10. At each point in the logistic pipeline, the logistical asset management process 16b scans the electronic signature of each uniquely identified asset into the CDD 14. The logistical asset management network and process 16 as part of scanning, encodes each digital signature with a status update. The CDD 14, in turn, allows users 19 of the closed loop asset management process architecture 10 to achieve real-time sharing of all relevant information such as order status, stocking location, notifications, or any other special instructions as required. Users 19 of the closed loop asset management process architecture 10 are represented by stations that interface with the unique identifier process 12 and CDD 14, via the logistical asset management network 16a and process 16b. Such users include manufacturers, repair, technicians, depots, shipping, configuration and test, warehouse customer order systems, and receiving. This results in a closed-loop process because the system 10 feeds data back to each of the users who can use this data to optimize management of the physical assets on a real-time basis.

Unique Identifier Number

Figure 2:
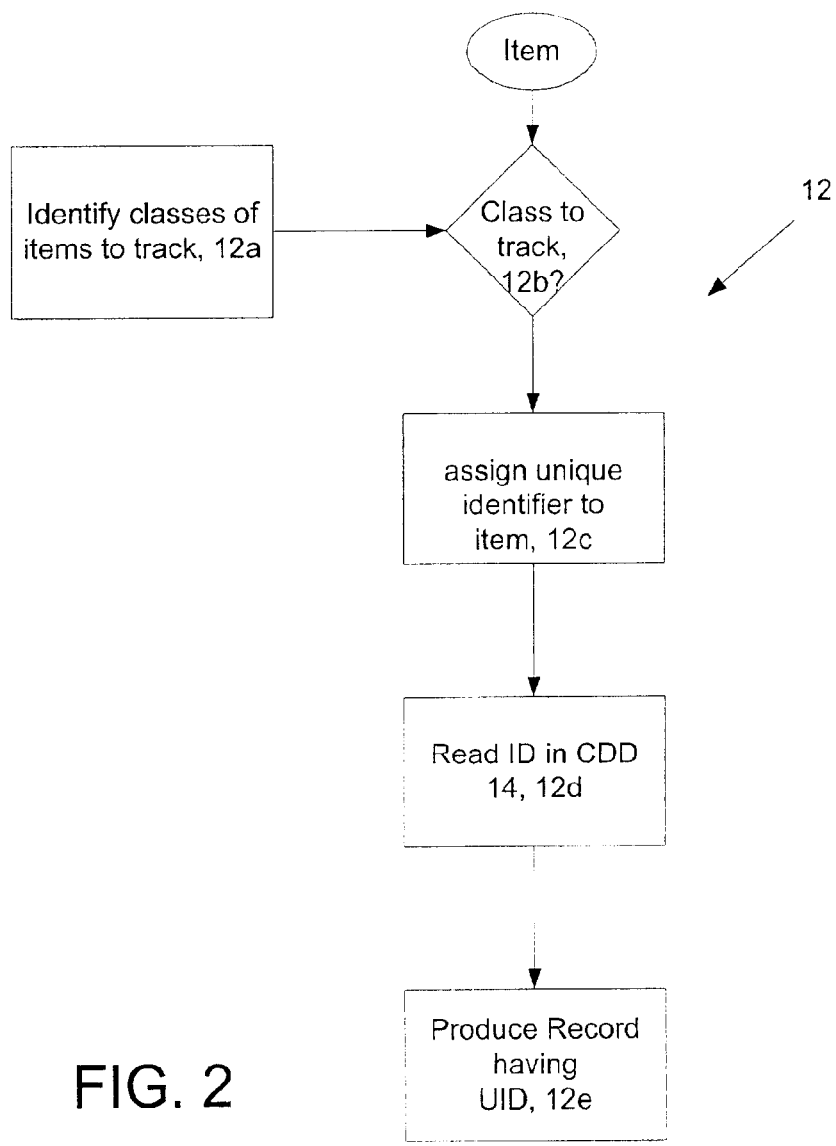
FIG. 2 is a flow chart depicting a unique identifier process.

Referring to FIG. 2, the unique identifier process 12 (hereinafter UIP) identifies 12a which specific product classes deserve tracking with the remaining products being treated as unidentified commodity items. Unit cost, relative scarcity, and frequency of repair are just a few of the variables that the customer can choose as cutoff points for determining which products warrant tracking under the closed loop asset management process architecture.

After selecting 12a, which product classes justify tracking, for each unit of each class that deserves tracking 12b, the UIP assigns 12c a unique identifier number, which is physically placed on the item wherever possible. Based on current technology, the best business practice for assigning a unique identifier number is a serialized bar code that can be later read by a scanning device, such as a bar code scanner. Other implementations in the future may include smart chips or other information storage and reading technologies.

Following the assignment 12c of a unique identifier number to each part, the UIP reads 12d the serialized barcode number into a CDD 14. In the typical case, a record is produced and stored in the CDD 14. The record is identified by the unique identifier and includes any relevant manufacturer's data, such as revision information, serial number, and other part specific data as may be appropriate in a given application. Associating the manufacturer's information with the serialized barcode number, as opposed to manual data entry, minimizes data error attributable to human entry. The UIP validates the initial input with a second scan, and the system provides immediate feedback if corrective action is needed.

Centralized Digital Database

Figure 3:
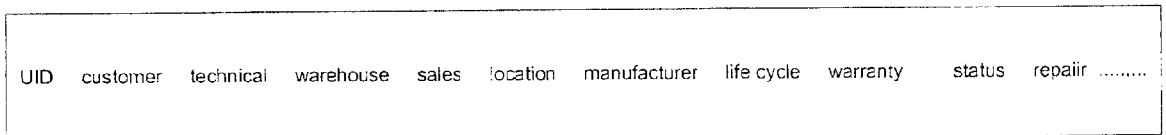
FIG. 3 is a diagram of a record.

Referring to FIG. 3, the process 10 uses the scanned unique identifier numbers to provide records 25 in the database 14. The records 25 can include information such as customer, technical, warehouse, sales, location, manufacturer, parts life cycle, warranty, status changes, repair data, and any other desirable data as a required by a specific application all associated with the unique identifier. The assignment of a unique identifier number to each product is a key component of the closed loop asset management process architecture 10 because the Centralized Digital Database 12 (CDD) uses this unique value to track the item throughout its life cycle. The tight integration of this data by the CDD 14 enables the closed loop asset management process architecture 10 to fully leverage the resulting data in CDD 14 across all channels of operation and communication. This tight integration also results in integrated operational and analytical systems, such as customer response system, technical assistance system, inventory management system, supply and production systems, transportation management system, warehouse management system, and equipment tracking function. The CDD 14 need not be physically central. The CDD 14 can be distributed over a large geographical area so long as there is high-speed reliable communication between constituent parts of the Centralized Digital Database.

It should be noted that the unique identifier is unique for all items tracked by the system. Thus, unlike serial numbers, part numbers and the like no two parts of different classes will possess the same unique identification. In addition, for all items of a class of items that will be tracked, each of those items will also have a unique identification. No two items in the class of items will share the same identification.

Logistical Asset Management Process Network

Figure 4:
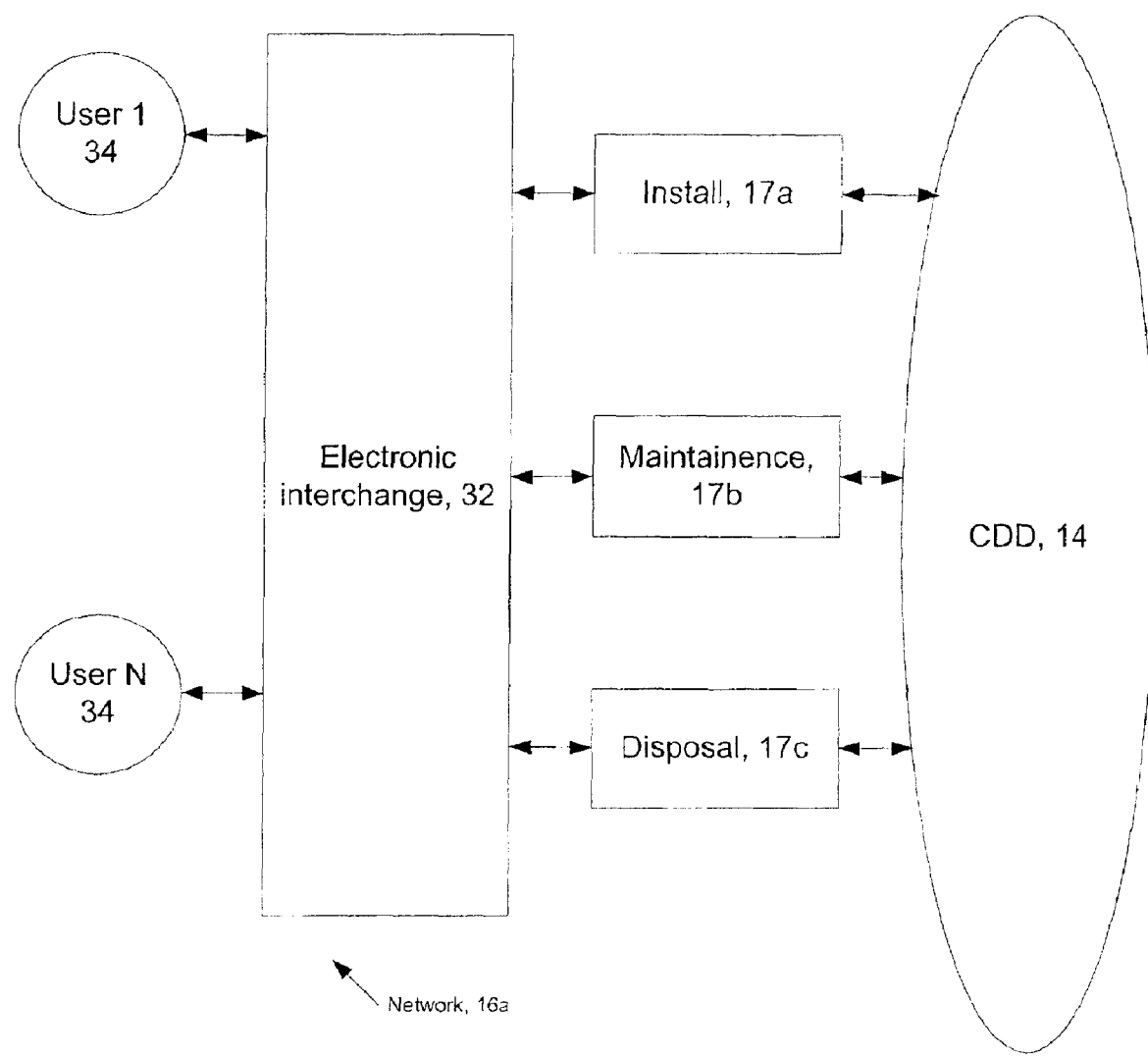
FIG. 4 is a diagram of a logistics asset management process.

Referring to FIG. 4, to implement a closed loop inventory business method, the closed loop asset management process 10 includes the logistical asset management network 16a and process 16b. The logistical asset management network 16a and process 16b act together as a feedback system that allows for the tracking of orders. The logistical asset management network 16a and process 16b also provides real time data on which identified products were installed at a client location, the status of each unique product while being used on the customer's premises, and knowledge concerning the ultimate disposition of each product.

Aspects of the logistical asset management network 16a includes an electronic data interchange network 32 that links multiple computer systems 34 in order to track the status and usage history, via the unique identifier numbers, of multiple products in various locations on a real-time basis. Such a network 32 can be implemented by various technologies, including TCP/IP connections, wide area network, local area network, and wireless technologies.

In practice, the logistical asset management process 16b has multiple components. These components will be constantly evolving as the closed loop asset management process architecture 10 uses knowledge gained to improve system efficiency. However, an embodiment of the logistical asset management network 16*a* and process 16*b*, includes three data-exchange points: installation 17*a*, maintenance 17*b*, and disposal 17*c*. At each point in the closed-loop, the logistical asset management process 16*b* users have either tethered and/or wireless scanners (part of the electronic interchange 32) to transmit the status of each unique serialized barcode, which is physically attached to the product to the CDD 14 for processing. The CDD 14, in turns, provides real-time and transparent information on the status of each part of the integrated supply chain. Each time the status of a previously uniquely identified product changes, the barcode is scanned and the logistical asset management process 16*b* transmits this updated information to the CDD 14, which, in turn, uses this new information to provide real-time knowledge to the users of the closed loop asset management process architecture 10.

Figure 5A:
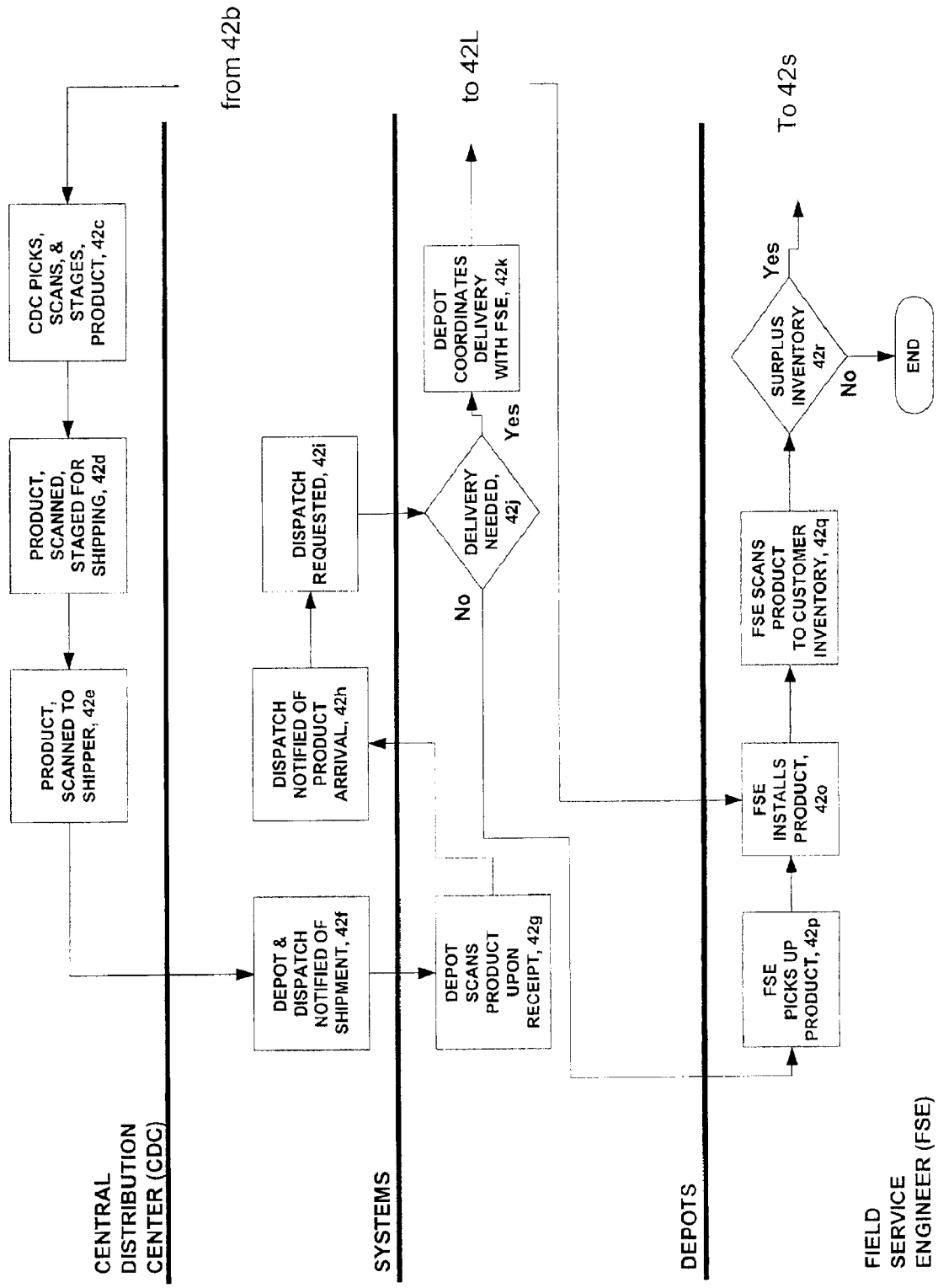
FIGS. 5A and 5B are block diagrams of an implementation of a closed loop asset process.
Figure 5B:
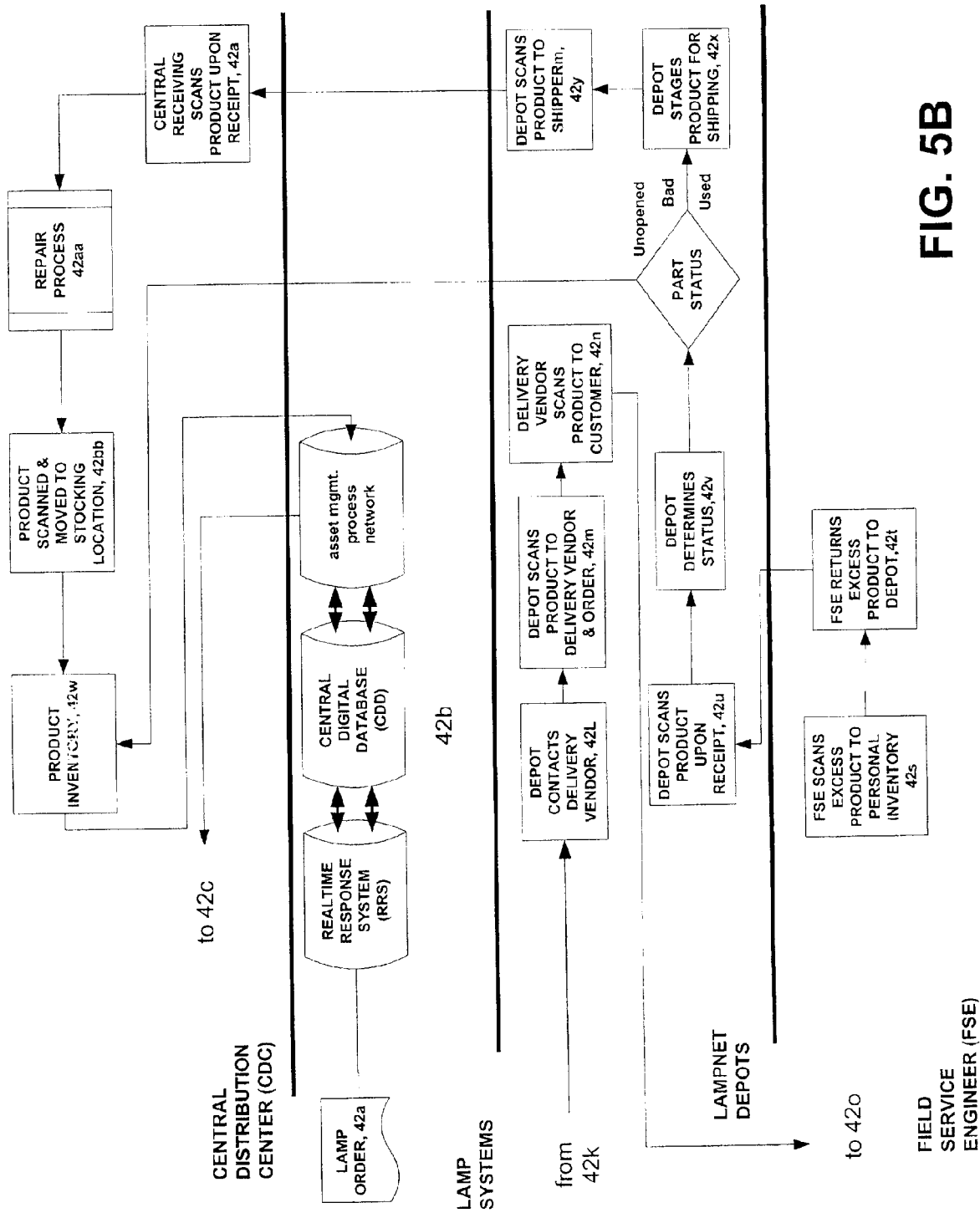

Referring to FIGS. 5A, 5B, an implementation 40 of the closed loop asset management process 16*b* is shown. This implementation includes a central distribution center, the system 16*a*, depots for staging delivery, and field service employee. The process 16*b* starts 42*a* with an order for a product 42, which is processed by the CDD, 14 and the UID, 12. The CDD 14 processes 42*b* this to a central distribution point, that picks, scans and tags the product 42*c*. The CDD 14 also scans 42*d* the product, and stages the product for shipping. The product is scanned 42*e* to shipper and the depot & dispatch are notified 42*f* of the shipment. The depot scans 42*g* the product upon receipt and dispatch is notified 42*h* of product arrival. Dispatch is requested 42*i* to determine if delivery is needed 42*j*. If yes, the depot coordinates 42*k* delivery a field service employee. The depot contacts 42*l* a delivery vendor and depot scans 42*m* the product to the delivery vendor. The delivery vendor scans 42*n* product to the customer and FSE. The FSE installs 42*o* the product. If no delivery is needed, the FSE picks up the product 42*p* and installs 42*o* the product. In any event, the FSE scans 42*q* the product to customer inventory, and the process determines 42*r* if it is surplus inventory. If yes, the FSE scans 42*s* the product to personal inventory and returns 42*t* excess product to depot. The depot scans 42*u* the product upon receipt and determines 42*v* the status of the part. The status is used to determine destination for the product. If unopened it is returned to inventory 42*w*. If bad or used, depot stages product for shipping 42*x*, depot scans 42*y* product to shipper and central receiving scans 42*z* product upon receipt. The product goes to a repair process 42*aa*, and afterwards the product is scanned 42*bb* and moved to stocking location and inventory 42*w*. At inventory, the CDD and system are updated with location and status of the product. In addition, at each point that the product is scanned the CDD is updated, so information pertaining to the location of the product is also current and can be shared with all users.

Installation Feedback Loop

Figure 6:
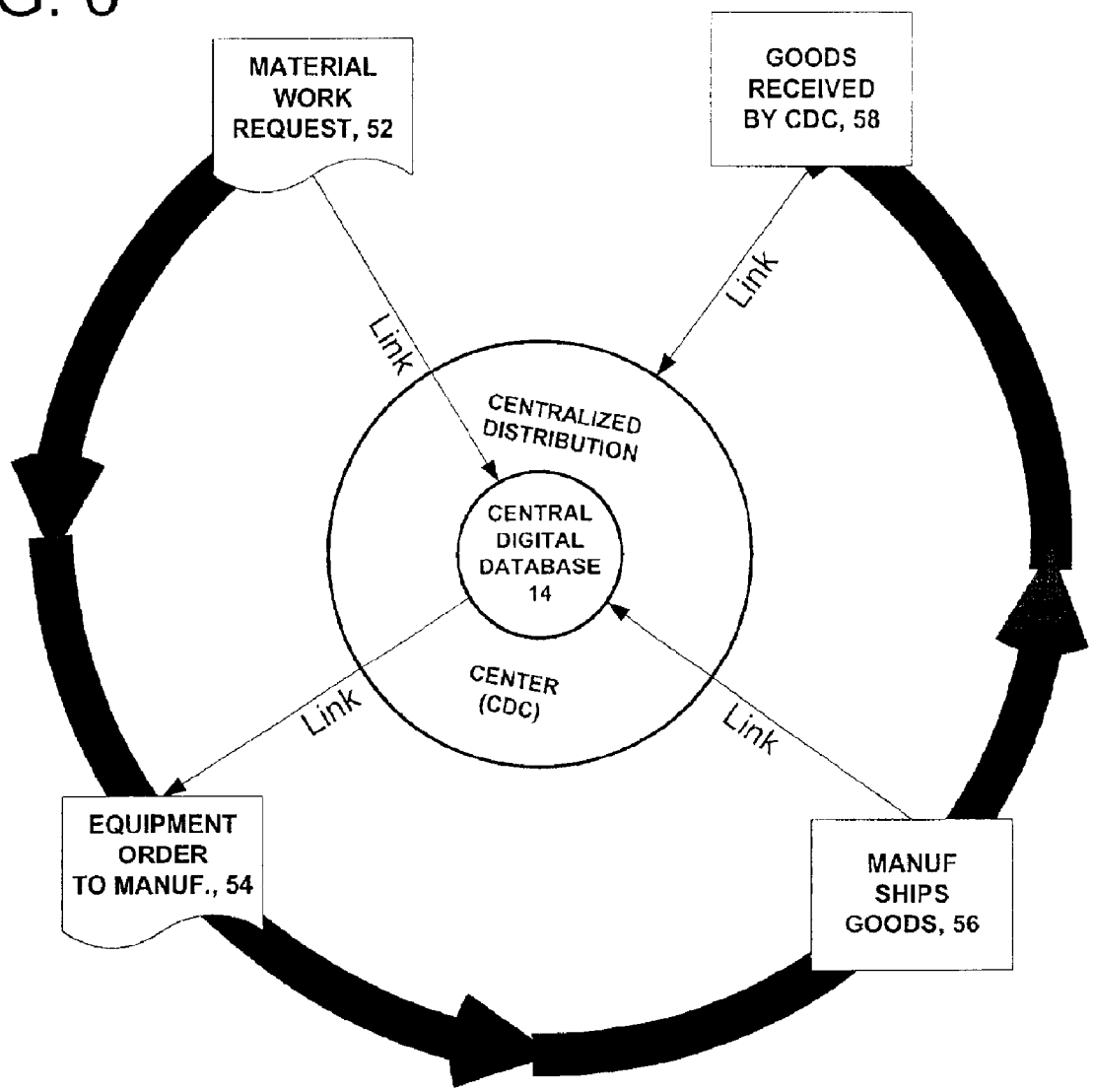
FIG. 6 is a diagram of a closed loop asset management process procurement process.

Referring to FIG. 6, a typical closed loop asset management process procurement process 50 is shown. Here, a customer places 52 an order with a manufacturer. Usually the order is placed electronically, for new equipment using a collaborative replenishment software system (not shown) that accesses data warehoused in the CDD 14. This action generates 54 an equipment order to a manufacturer, who subsequently ships 56 the ordered goods to the customer. When the goods are received 58, at the manufacturer's location or at a separate Material Stocking Location (MSL), logistical asset management network and process 16' executes.

Figure 7:
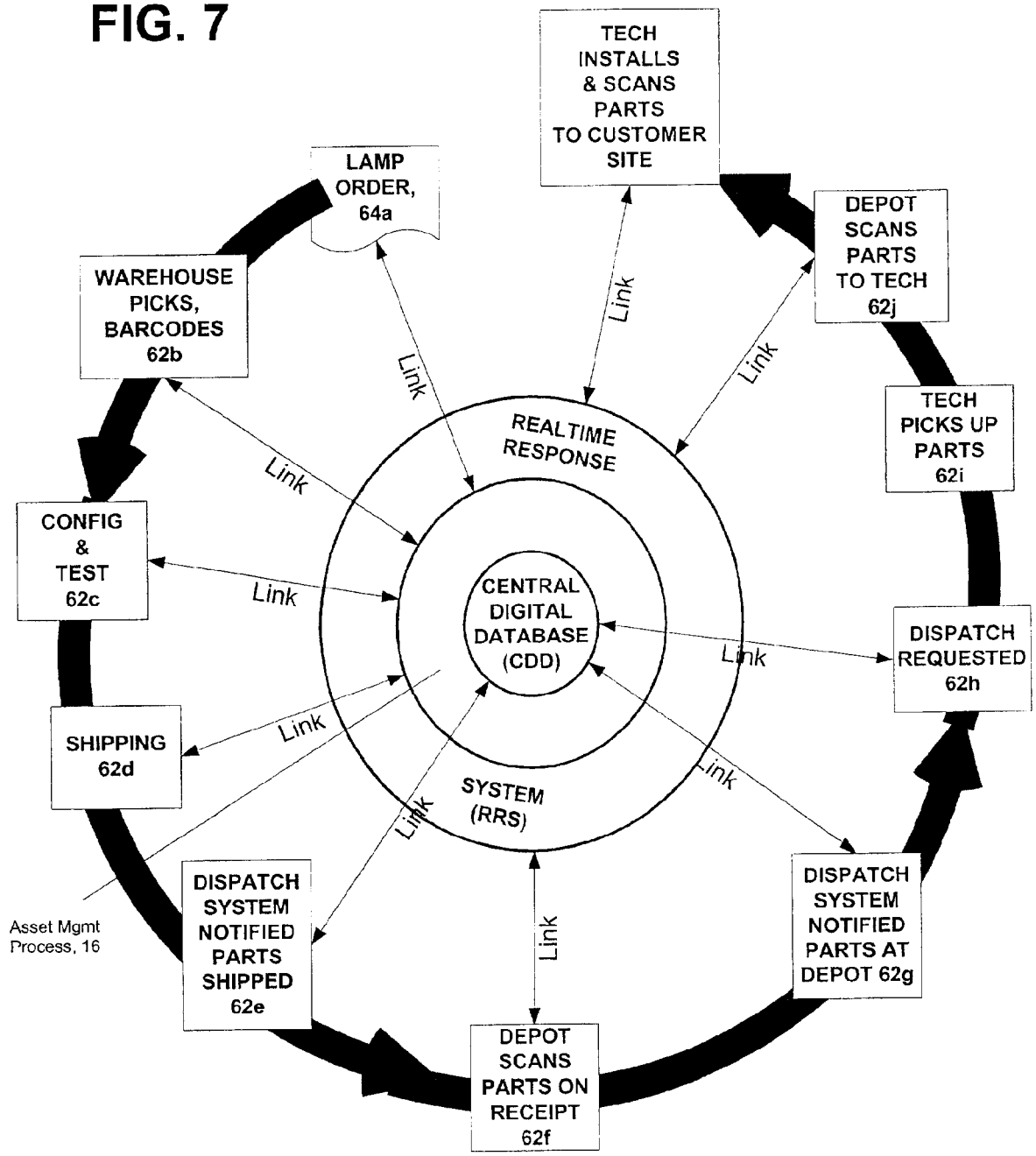
FIG. 7 is a diagram of a closed loop asset management system install process.

Referring to FIG. 7, one example of the logistical asset management process 16*b* using the network 16*a* for an install process is shown. This implementation of logistical asset management network and process 16*b* includes an order facility 62*a*, central distribution 62*b*, configuration and test 62*c* and the system 10. In addition depots 62*d* are used along with field service 62*e* and a customer facility 62*f*.

At each stage, whether remote or local, the logistical asset management network and process receiving system 16*a* conveys the location and status of the each uniquely identified product, as opposed to a generic shipping unit, to the CDD 14. This information is conveyed using logistical asset management network and process 16 over links may be hard wired, a dialup network, a wireless system or any other technique of reliably conveying the information. Each time the logistical asset management network and process receiving system 16*a* handles an identified product, it is scanned, e.g., initial entry, pick, pack, staged for shipment, and scanned to shipper and all transactions are all tracked in the CDD.

When a customer is ready for an install 64*a*, the customer electronically submits a work order request to the CDD 14 requesting delivery. The CDD 14 verifies the specific request against the master workorder. If approved, the CDD 14 reviews its real-time inventory and field stock to determine the most cost-effective shipping location for filling the order. Once the CDD 14 selects the best stocking location to pick from, the CDD 14 issues a shipping order to the appropriate logistical asset management network and process partner (e.g., a material stocking location (MSL), depot, field service vehicle). The CDD 14 searches all available inventory when making this decision. Availability inventory includes items ordered, but not yet shipped by the manufacturer, products assigned a serialized barcode, but still stocked at a central warehouse, and serialized products in transit. Also available inventory includes serialized products at a remote storage location, serialized products stored on a specific field service vehicle, unused serialized products stocking at a different customer's location, and repaired or no-trouble-found serialized products ready for re-install. Thus, instead of looking only at newly-issued parts, such as would be the case in an open-loop system, the closed loop asset management process architecture uses the intelligence gained via its CDD 14 to fill orders in the most optimal manner.

Once the CDD 14 determines the best fit for a specific order, it sends 64*b* a pick order to an appropriate logistical asset management network and process 64*c* for configuration and testing at a stocking location 16*b*. A logistical asset management network and process stocking location 16*b* can be for example a warehouse a depot, or a field service vehicle. At the selected stocking location 16*b* the product is scanned and assigned to order pending. At the stocking location 16*b* the order can be verified and made ready to be shipped 62*d*. The stocking location 16 is also where the unique product is sent to a staging area where a carrier scans the product out for delivery. Again, the scanning process updates the CDD 14 on the status of each uniquely identified product at that stage. The CDD 14 notifies the appropriate logistical asset management network and process receiving location 16*a* of the priority status of the incoming order.

The shipment 62*d* to the customer's premises either goes directly to the customer, to another MSL, to a third-party depot, or directly to a field service vehicle. In each case, the mechanics of the transaction are similar. The carrier delivers each unique product to the predetermined logistical asset management network and process stocking location 16*b*, which verifies address, signature, and scans out each product from the carrier's manifest. The logistical asset management network and process stocking location 16*b* uses the serialized barcode to scan in each uniquely identified product and its storage location into the CDD as received. If the interim stocking location changes, the responsible party transmits this information to the CDD.

After receiving notice 62e from the CDD dispatch order system (not shown) that requested products are available the depot scans 62f the products in and notifies field service 62g. A field service employee, e.g., an engineer, technician, etc., travels 62h to the logistical asset management network and process stocking location 16b and picks up 62i the products assigned to the order. At the logistical asset management network and process stocking location 16b the products are scanned out 62j as having been received by the field service employee.

The field service employee scans (not shown) in the products to his field-stocking inventory and proceeds to the customer's premises. After installing and verifying the products, the field service employee scans out 62k the products from his field stock as having been delivered and installed at the customer site. The field service employee's scanner transmits this information directly to the CDD either using a landline or, if within range, a wireless equipment tracking system (not shown).

As described, the installation feedback loop is one of at least three gateways for updating the closed loop asset management process architecture 10. As the uniquely identified products move from the UIP station to a stocking location 16b to a field service vehicle 16c to the customer's premises 16d, the logistical asset management network and process system 16 each product is scanned in and out at each station along the way. This feedback provides a closed-loop system instead of an open-loop system.

Maintenance Feedback Loop

Figure 8A:
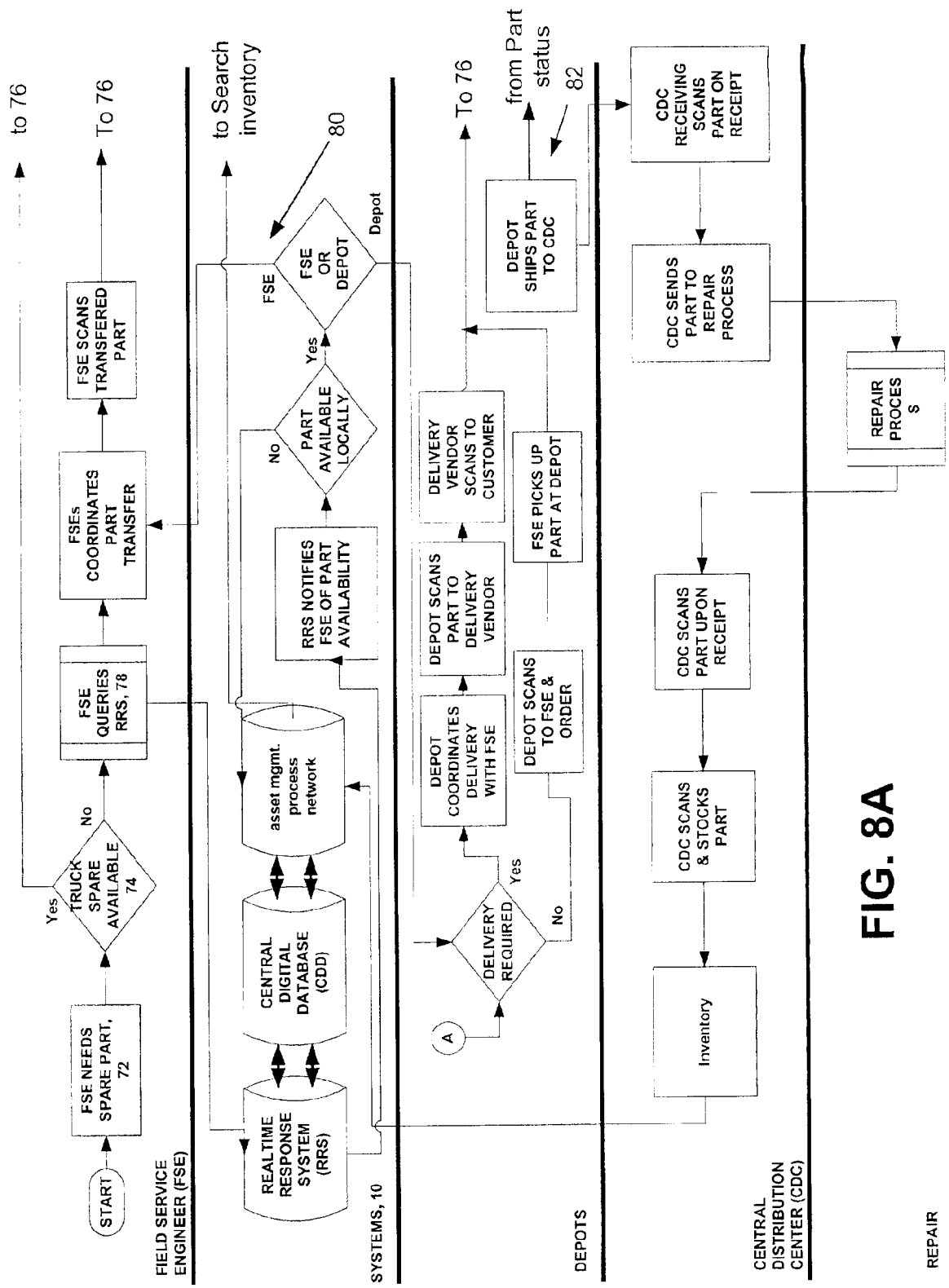
FIGS. 8A–8C are diagrams of a closed loop asset management spares replenishment process.
Figure 8B:
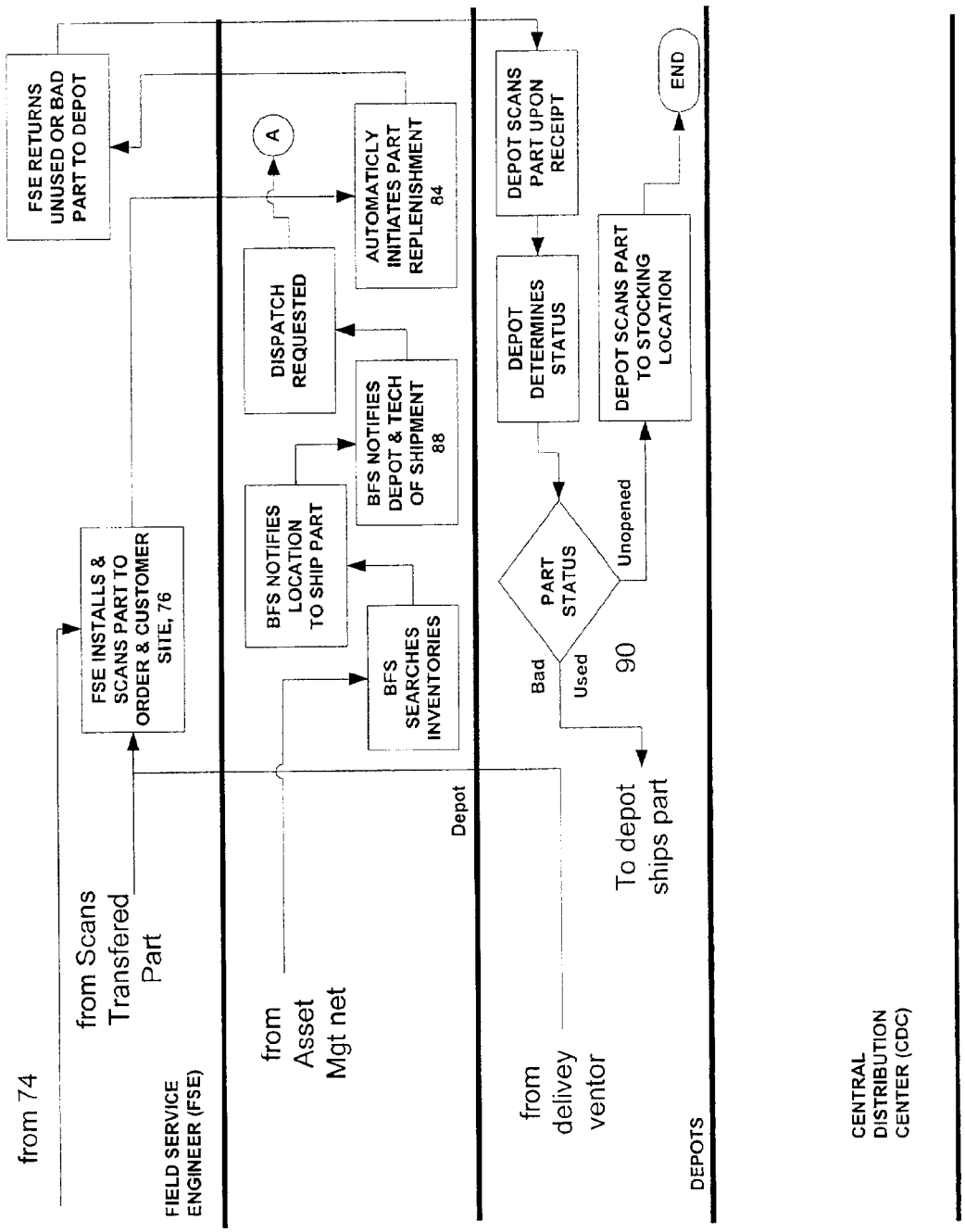

FIGS. 8A and 8B shows a spares replenishment process 70. A field service employee needs a part to complete a work assignment 72. The field service employee checks his assigned rolling inventory in his service vehicle 74. If the part is available, the field service employee installs and scans the item from the assigned rolling inventory to customer site inventory 76.

If the part is not on the service vehicle, i.e. not available in rolling inventory, the field service employee requests 78 the item from the system 10 via wireless equipment if within range, or uses a dial-up system using conventional phone service if not. The system 10 searches 80 deployed inventories for item. If not found locally the logistic asset management initiates shipment from a Centralized Distribution Center (CDC) or other deployed inventory to a local logistical asset management network and process Depot 16b.

When ready, the logistic asset management process updates the Centralized Digital Database order status that equipment is available at the logistical asset management network and process Depot 16b. The logistical asset manger process 16 dispatches the field service employee to the logistical asset management network and process depot who picks up equipment 82. The logistical asset management network and process depot 16b scans the part to the field service employee, and finally, the field service employee installs and scans equipment to customer site inventory 74.

The CDD automatically initiates the replacement of the used inventory 84. If field service employee inventory was used, replacement equipment will be made available at the logistical asset management network and process depot to refill truck inventory. The Centralized Digital Database prepares a restock request that assigns to specific field service employee and transmits field request to logistical asset management network and process depot 16b.

At the warehouse to which the order was placed the order is picked, and barcode scanned. The part is configured, tested and the product is shipped. The logistical asset management network and process depot are notified that the part has been shipped 88. At the logistical asset management network and process depot the product is scanned in receipt of product, and the product is staged for pick-up. The field service employee arrives at logistical asset management network and process depot and picks up the part, which is scanned out to a field service employee's personal inventory and logistics asset management field request.

Figure 8C:
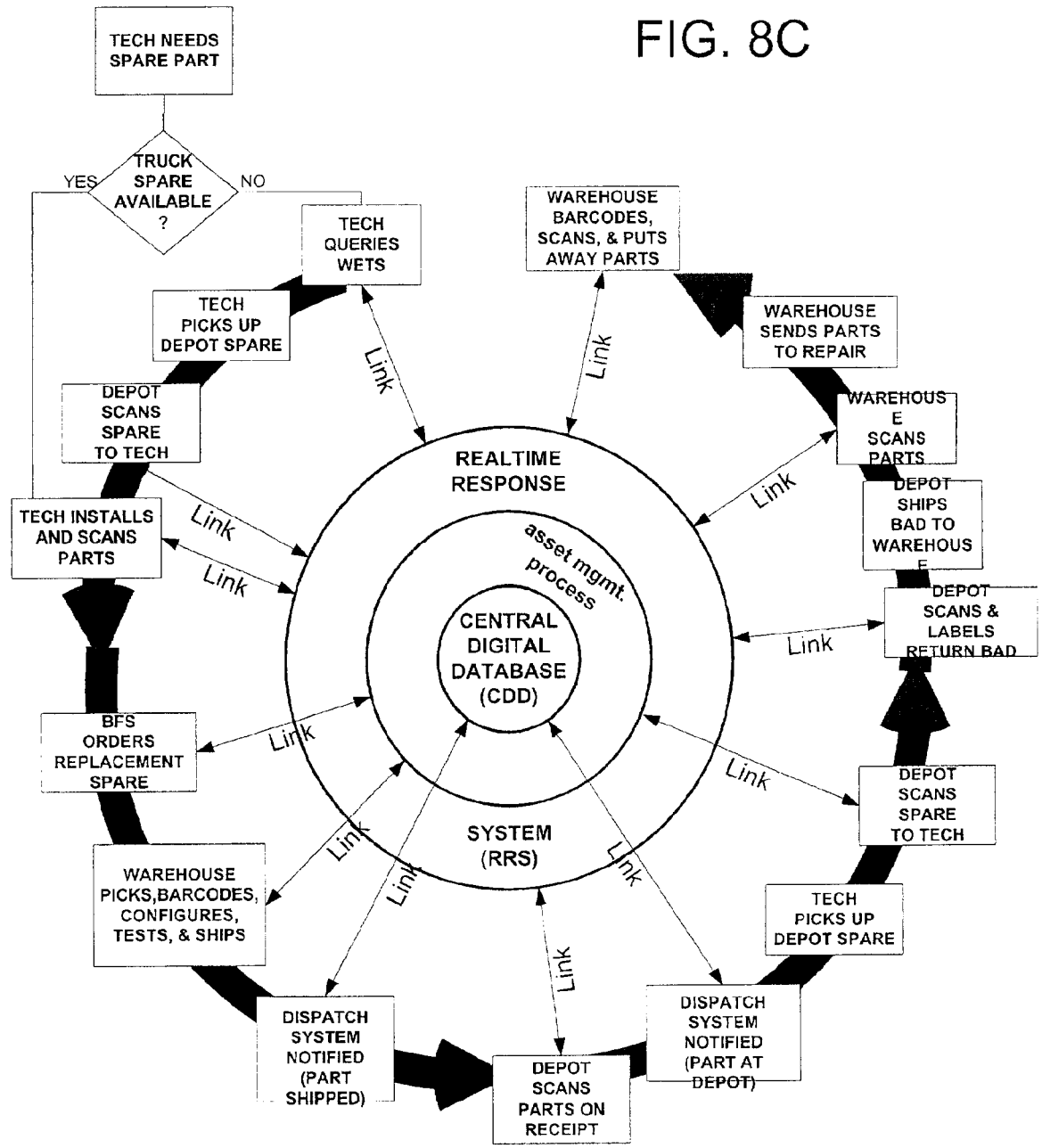

Bad parts are returned 90 to the logistical asset management network and process depot 16b and scanned in and labeled as bad. The logistical asset management network and process depot ships the bad parts to a warehouse which receives the part, and ships parts to be repaired off premises or repairs them in its own facility. Once repaired, the part is again bar coded, scanned and put back into available inventory. A summary of this process is shown in FIG. 8C.

Figure 9:
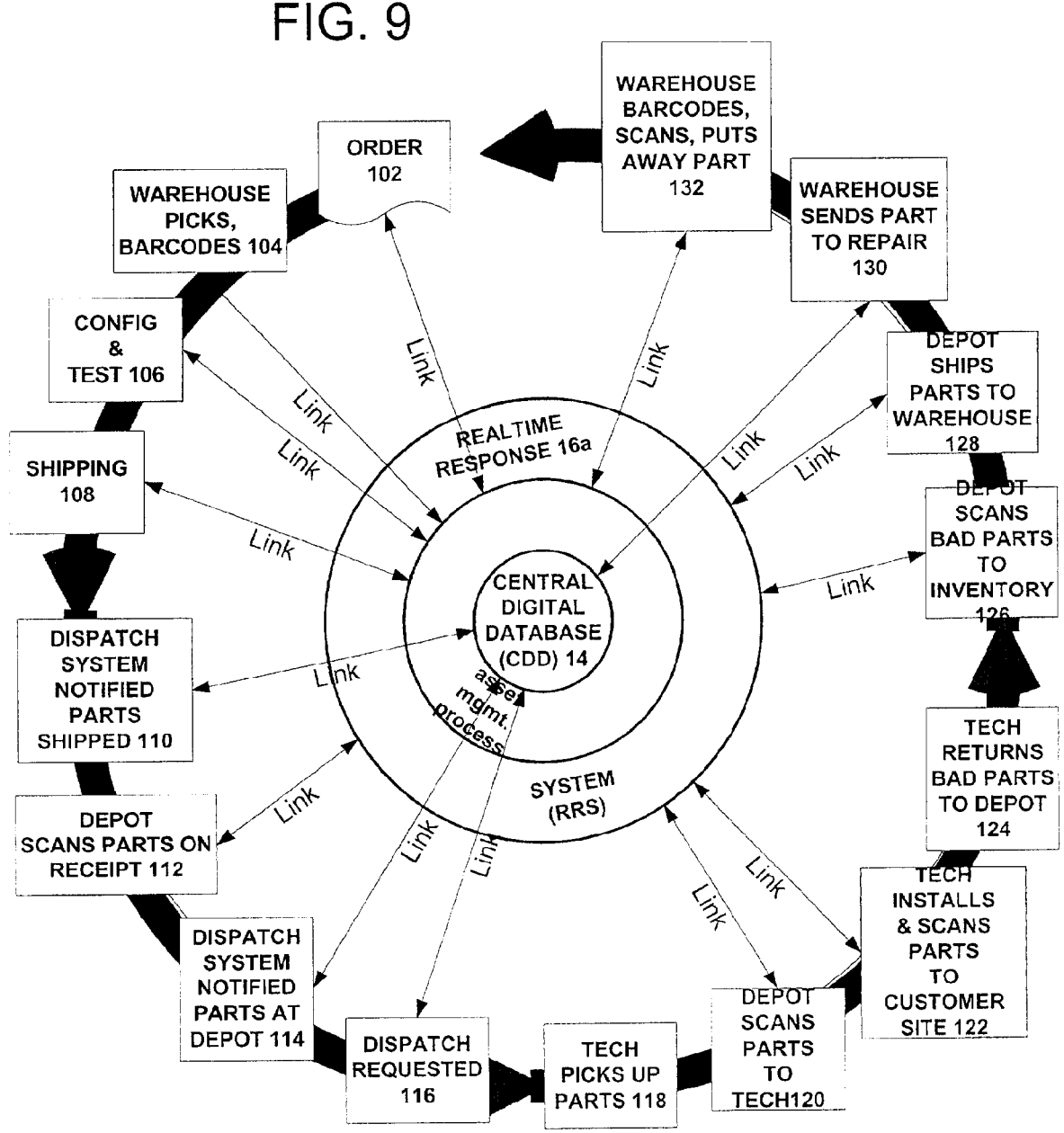
FIG. 9 is a diagram of a closed loop asset management Customer Premises Repair/Change Process.

FIG. 9 shows a summary of a Customer Premises Repair/Change Process. An order for a unit 92 is submitted and the order is transmitted by logistic management process 16b to the logistic asset management process, which receives the order and verifies availability. If the part is available as truck stock (i.e. in an field service employee's service vehicle) or at the local logistical asset management network and process depot, the logistic asset management process notifies the dispatch system of part availability. If the part is not locally available, the Centralized Distribution Center (CDC) picks and bar codes the part 94, configures, tests and certifies revision levels 96, packs, and ships the equipment order 98. The system 10 notifies the dispatch system of the shipment 100. The logistical asset management network and process depot scans parts upon receipt 112 updating location to the system 10.

The system 10 updates the dispatch system order status that equipment is available at the depot 114. Thereupon, the system dispatches a field service employee to the depot to pick up equipment 116. At the depot the parts are scanned to the field service employee 120. The field service employee installs and scans equipment to customer site inventory 122. The wireless equipment tracking system records equipment assignment and transmits this information back to the Centralized Digital Database 14.

If there are extra or unused parts, they are returned to the depot per the return to depot process described above. Similarly, defective parts are returned to the depot 122 by the field service employee. The depot scans in the defective parts 126 and ships them to a warehouse 128. The warehouse either repairs the parts internally, or ships the part out for repair 130. Upon completion of repairs (and return of parts shipped out for repair) the warehouse barcodes, sans and puts away the part 132.

Disposal Feedback Loop

Figure 10:
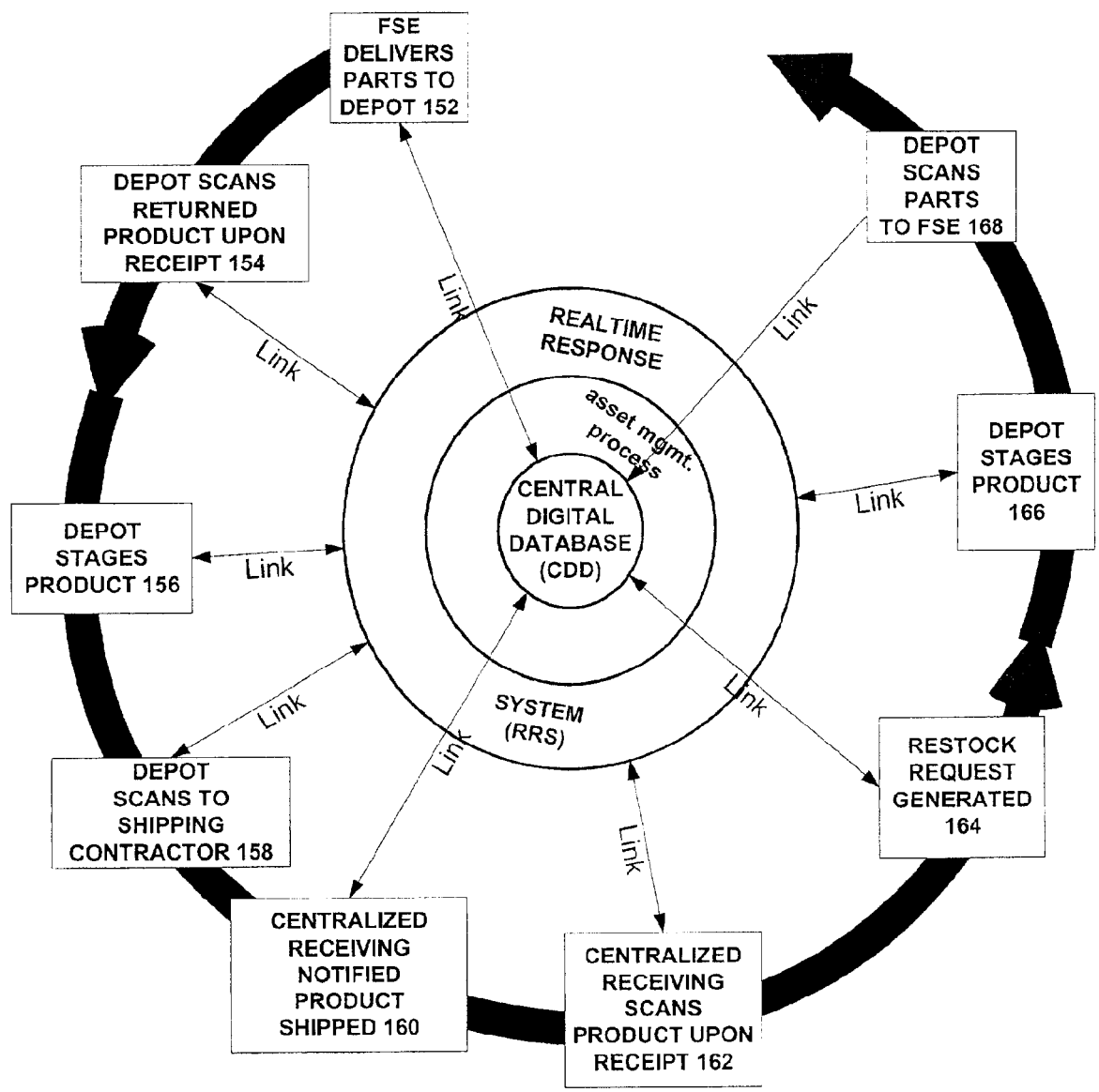
FIG. 10 is a diagram of a closed loop asset management system Depot Product Return Process.

FIG. 10. shows a logistical asset management network and process depot product return process 150. A field service employee (field service employee) returns to a logistical asset management network and process depot and delivers units to be returned 152 to the logistical asset management network and process depot which scans in the parts 154 updating the Centralized Digital Database 14.

The logistical asset management network and process depot 16b scans in defective, disposable, or excess parts and clears field service employee (field service employee) and completes the field request. The logistical asset management network and process depot scans items and stages a disposal bag 156 for pick up by shipping contractor 158.

The logistical asset management network and process depot transmits scanned information to Centralized Digital Database via a wireless tracking system, e.g., personal digital assistants and the like, which update product, equipment, and services Inventory records. The Contract Shipper picks up the disposal bag 160 and delivers to Centralized Receiving 162.

If additional field service employee truck stock was used, this information will have already been transmitted to the Centralized Digital Database 15 and replacement equipment will have been stocked and ready to refill the field service employee's truck stock. (not shown). The Centralized Digital Database 15 prepares a restock request 164 that assigns to specific field service employee and transmits field request to logistical asset management network and process depot, which stages product 166 for delivery to a field service employee. The logistical asset management network and process depot pulls product and scans out to a field service employee's personal inventory stock 168 and field request.

Figure 11:
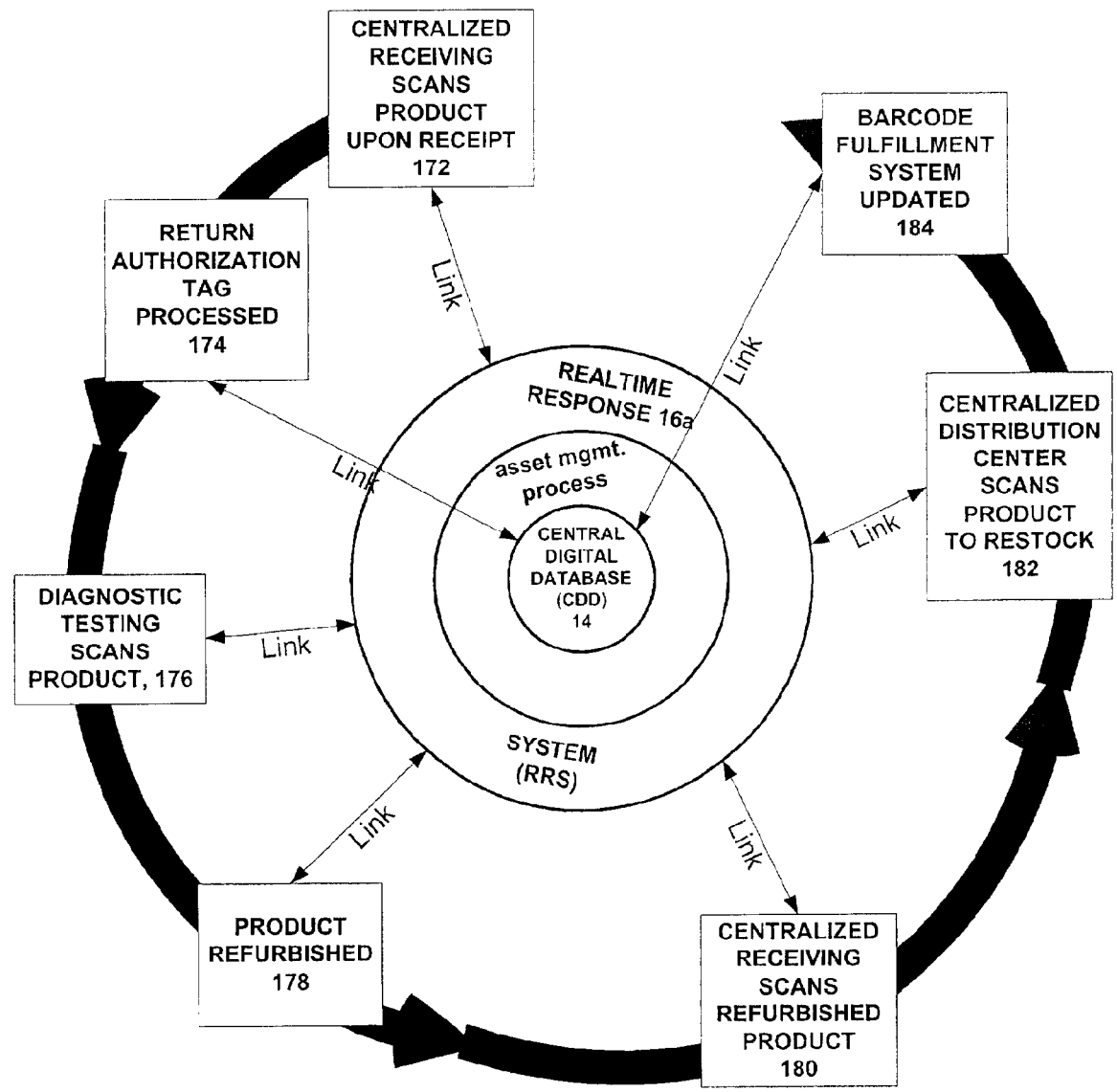
FIG. 11 is a diagram of a closed loop asset management Centralized Distribution Center Return Process.

FIG. 11 shows a Centralized Distribution Center Return Process 170. Centralized receiving scans in the receipt of a return authorization tagged equipment 172 and scans out to return control updating the Centralized Digital Database (Centralized Digital Database).

Return control scans in receipt of return authorization tag equipment 174 and based on business requirements (1) testing intervals (2) manufactures repair (3) disposal, the product is scanned out updating the Centralized Digital Database 14.

Diagnostic Testing scans in product 176 and determines the reason(s) for failure and records this in the Centralized Digital Database 15 as "No-Trouble Found," "Repair" or "Disposal."

"No-Trouble Found" parts are scanned to centralized receiving for restocking updating the Centralized Digital Database 182. Repaired parts are refurbished 178 and then scanned out to Centralized Receiving for restocking as refurbished inventory 180 updating the Centralized Digital Database 14. Disposed parts are scanned out to the asset disposal contractor updating the Centralized Digital Database 14. The logistic asset management process electronically transmits 184 the scanned Disposal information CDD. Other information may be required as is appropriate for a particular application.

The closed loop asset management process can give requisite information to field service employee so that dispatched service calls can be closed on an initial visit because the field service employee will have the correct parts needed to complete a job. With ready information it avoids the tendency of maintaining excess field service inventory. With prior techniques many field service employees keep unused parts on their service vehicle as an ad hoc safety stock, instead of returning them to a material stocking location inventory. This closed loop asset management process enables accountability for each part. The result is avoiding an inventory stockpile that inflates a firm's inventory investment or does not get charged to a customer when eventually used. It also minimizes maintaining obsolete inventory or inventory that may be illegally sold to a gray market vendor. It also avoids assets being overvalued on the a company's financial statements because the accounting system can now allocate dollar costs to spare parts inventory and also track use or disposition of specific parts.

This also solves problems associated with No-Trouble-Found (NTF) inventory. NTF inventory occurs when a field service employee pulls a suspected defective part, but subsequent testing determines it to be functional. With specific tracking of each suspected defective part, it is possible to provide feedback to the field service employee regarding his or her initial determination. Moreover, while the specific part may not be defective, there may be other issues unique to that specific installation. Providing the ability to backtrack a NTF part to a specific installation, the Customer Premise Equipment service provider can possible determine the true cause of the initial problem.

One or more embodiments of the invention have been described. Nevertheless, it will be understood that various modifications may be made without departing from the scope of the invention. For example, a closed loop asset management system may be beneficially implemented and used to track automobile manufacturing and sales. The closed loop asset management system may be implemented with a variety of communications means, and for a variety of assets to be tracked. Accordingly, other embodiments are within the scope of the following claims.

What is claimed is:

1. A system for managing physical assets, the system comprising:

a computer database that for tracking physical assets with each physical asset assigned a unique identifying code that is unique for all assets tracked by the system with no two assets belonging to different classes of physical assets and no two assets belonging to the same class of physical assets having the same identifying code;

a plurality of scanners located in a corresponding plurality of different geographic locations throughout the system, the scanners being capable of reading the unique identifying code assigned to a particular physical asset, the unique identifying code being embedded in a unique identifying label attached to the physical asset;

a communications link between the plurality of scanners and the computer database; and wherein every time a status of a physical asset changes over the course of a cycle of change in status, the unique identifying label attached to the physical asset is scanned by one of the plurality of scanners and the unique identifying code is transmitted over the communications link to the computer database.

2. The system of claim 1 wherein geographic location information is transmitted over the communications link to the computer database along with the unique identifying code every time the status of the physical asset changes.

3. The system of claim 1 wherein the unique identifying code assigned to a particular physical asset is associated with a unique record stored in the computer database.

4. The system of claim 3 wherein the unique record comprises information specific to the physical asset.

5. The system of claim 4 further comprising a database server connected to the computer database for facilitating communication between a user and the computer database.

6. The system of claim 5 wherein the database server is connected to a network.

7. The system of claim 6 wherein the network comprises the World Wide Web.

8. The system of claim 6 wherein the location of the physical asset is updated in real-time to the computer database.

9. The system of claim 4 wherein the specific information in the record includes status information relating to the status of the physical asset.

10. The system of claim 4 wherein the record includes status information relating to the status of the physical asset.

11. The system of claim 10 wherein transmitting the unique identifying code over the communications link to the computer database causes the status information in the record to be updated.

12. The system of claim 10 wherein status update information is transmitted over the communications link to the computer database along with the unique identifying code every time the status of the physical asset changes.

13. The system of claim 4 wherein the user can update a record corresponding to a particular physical asset through a database server.

14. The system of claim 13 wherein in response to receiving the unique identifying code, the computer database transmits information stored in the record corresponding to the physical asset over the communications link.

15. The system of claim 1 wherein the unique identifying label attached to a physical asset is scanned every time the physical asset is moved.

16. The system of claim 1 wherein the communications link is wireless.

17. The system of claim 1 wherein a vendor is connected to the to the computer database over the communications link allowing the vendor to and provides information about a particular physical asset to the computer database.

18. The system of claim 1 wherein the status of a physical asset includes the geographic location of the physical asset.

19. The system of claim 1 wherein status update information is transmitted over the communications link to the computer database along with the unique identifying code every time the status of the physical asset changes.

20. The system of claim 19 wherein the status update information includes location information.

21. A method of asset management comprising:
   assigning each physical asset to be tracked a unique identifying code that is unique for all assets to be tracked with no two assets belonging to different classes of physical assets and no two assets belonging to the same class of physical assets having the same identifying code;
   providing the unique identification code assigned to a physical asset in a unique identifying label and attaching the unique identifying label to the physical asset;
   providing a central computer database having a plurality of records, with each record being associated with a particular physical asset and being identified by the unique identifying code associated with the physical asset, with the record including information specific to the physical asset;
   providing a plurality of scanners located in a corresponding plurality of different geographic locations and capable of reading the unique identifying labels;
   providing a communications link between a the plurality of scanners and the central computer database;
   scanning the unique identifying label attached to a physical asset with one of the scanners every time the status of the physical asset is changed over the course of a cycle of change in status; and
   transmitting status update information and the unique identifying code over the communications link to the central computer database every time the status of the physical asset is changed over the course of a cycle of change in status.

22. The method of claim 21 wherein the status of a physical asset includes the geographic location of the physical asset.

23. The method of claim 22 wherein scanning the unique identifying label attached to the physical asset encodes the geographic location of the physical asset in the status update information transmitted over the communications link to the computer database.

24. The method of claim 21 wherein the central computer database provides users real-time sharing of the information specific to the physical asset stored in the records of the central computer database.

25. The method of claim 21 further comprising:
   uniquely identifying which specific product classes deserve tracking.

26. The method of claim 21 further comprising:
   transmitting information stored in the record corresponding to the physical asset from the central computer database over the communications link in response to the central computer database's receipt of the status update information and unique identifying code.

27. The method of claim 21 further comprising:
   scanning the unique identifying label attached to a physical asset with one of the scanners at a plurality of different data exchange points;
   transmitting status update information and the unique identifying code over the communications link to the central computer database upon scanning the unique identifying label at each of the plurality of data exchange points: and
   transmitting information stored in the record corresponding to the asset, from the central computer database over the communications link in response to receipt of the status update information and unique identifying code.

28. The method of claim 21 wherein the status of a physical asset comprises:
   installed at a customer location,
   inventory,
   disposed of, or
   being repaired.

29. The method of claim 21 further comprising:
   providing an electronic network for linking multiple computer systems located in various locations to the central computer database such that the computer systems can be used to access the records of physical assets and track the status of assets from various locations on a real-time basis.

30. The method of claim 29 wherein the data exchange points comprise:
   an installation location, a maintenance location, and a disposal location.

* * * * *